(12) United States Patent
Sugano et al.

(10) Patent No.: US 6,473,459 B1
(45) Date of Patent: Oct. 29, 2002

(54) SCENE CHANGE DETECTOR

(75) Inventors: Masaru Sugano, Tokyo; Yasuyuki Nakajima; Hiromasa Yanagihara, both of Saitama; Akio Yoneyama, Tokyo, all of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/255,965

(22) Filed: Feb. 23, 1999

(30) Foreign Application Priority Data

Mar. 5, 1998 (JP) .......................................... 10-071398

(51) Int. Cl.$^7$ ................................................ H04B 1/66
(52) U.S. Cl. ................................................ 375/240.16
(58) Field of Search ...................... 375/240.16; 348/571, 348/700, 231; 382/239, 173, 100

(56) References Cited

U.S. PATENT DOCUMENTS

| | | | | |
|---|---|---|---|---|
| 5,068,724 A | * | 11/1991 | Krause et al. | 375/240.16 |
| 5,635,982 A | * | 6/1997 | Zhang et al. | 348/231 |
| 5,734,735 A | * | 3/1998 | Coleman, Jr. | 382/100 |
| 5,815,217 A | * | 9/1998 | Kumazawa et al. | 348/700 |
| 5,847,772 A | * | 12/1998 | Wells | 348/571 |
| 5,987,183 A | * | 11/1999 | Saunders et al. | 382/239 |
| 6,061,471 A | * | 5/2000 | Coleman, Jr. | 382/173 |

FOREIGN PATENT DOCUMENTS

| JP | 8-252333 | 9/1996 |
|---|---|---|
| JP | 9-41706 | 2/1997 |

OTHER PUBLICATIONS

"A Fast Detection Method of Scene Breaks from MPEG Encoded Movies", Kaneko, Hor, Information Processing Society of Japan, annual Convention, 5N–2 (1997).

A Scene Cut Detection from Compressed Video Using Interframe Luminance Difference and Chrominance Correlation:, Makahima, Institute of Electronics, Information and Communication Engineers, Spring Conference, D–501 (1994).

"Scene Change Detection from MPEG coded data", Niikura, Taniguti, Tomura, et al., Institute of Electronics, Information and Communication Engineers, Technical Report, IE97–65 (1997).

\* cited by examiner

*Primary Examiner*—Chris Kelley
*Assistant Examiner*—Allen Wong
(74) *Attorney, Agent, or Firm*—Westman, Champlin & Kelly, P.A.

(57) ABSTRACT

A coding parameter extracting unit extracts predictive-coded mode information, motion vectors, and coded transformed coefficients from video-signal-demultiplexed information. An abrupt scene change judging unit uses a characteristic that scenes change greatly before and after an abrupt scene change, to classify blocks on the basis of the predictive-coded mode information among the compressed moving picture data, so that an abrupt scene change is detected. A special effect judging unit detects dissolve from motion characteristic values calculated from the values of motion vectors, predictive-coded picture characteristic values derived from coefficients on frequency domains in blocks, and the number of blocks each having a motion vector that is larger than a threshold; and detects wipe by motion characteristic values calculated from the values of motion vectors, and predictive-coded picture characteristic values derived from coefficients on frequency domains in blocks. According to this architecture, scene changes including special effects such as dissolve or wipe can be detected at high speed and high accuracy by a processing which is far less than that of the prior art.

20 Claims, 7 Drawing Sheets

Fig. 3A  TEMPORAL SUBSAMPLING OF FRAMES
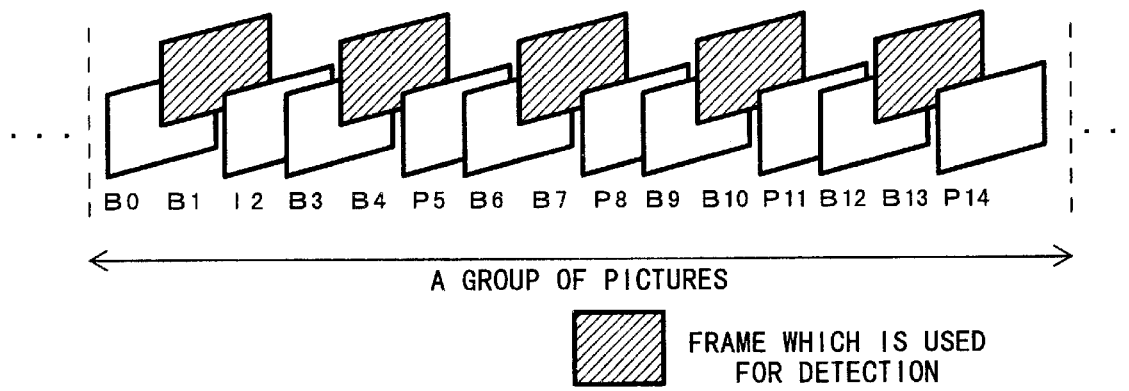
A GROUP OF PICTURES
▨ FRAME WHICH IS USED FOR DETECTION
Fig. 3B  SPATIAL SUBSAMPLING OF FRAMES
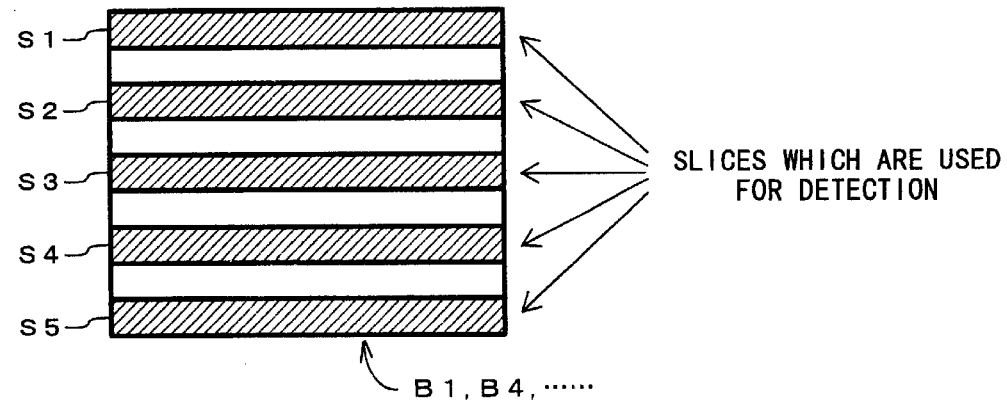
SLICES WHICH ARE USED FOR DETECTION
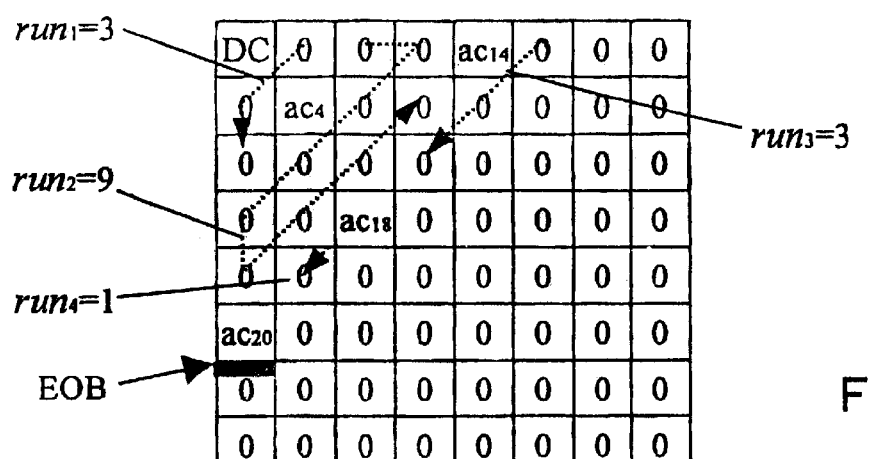
Fig. 4
$$BL_i = |ac_4| + |ac_{14}| + |ac_{18}| + |ac_{20}|$$
$$BR_i = \sum_{j=1}^{4}(run_j + 1) = 20$$

ABRUPT SCENE CHANGE AT AN I OR P FRAME

ABRUPT SCENE CHANGE AT THE FIRST B FRAME

ABRUPT SCENE CHANGE AT THE SECOND B FRAME

Fig. 6
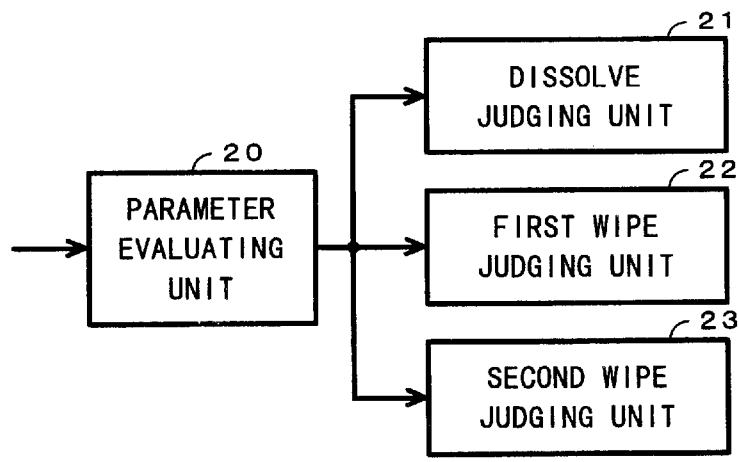
Fig. 8A
Shot A 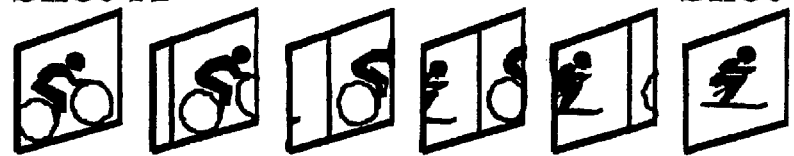 Shot B 
Fig. 8B
Shot A 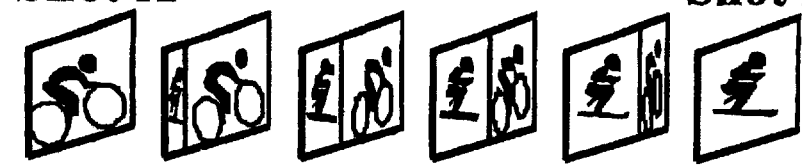 Shot B 
Fig. 8C
Shot A 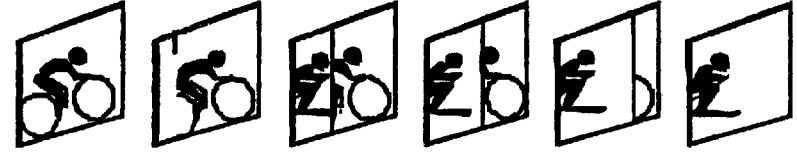 Shot B 

Fig. 10

$$Mmvfx = \frac{\sum_{i=0}^{Nmvf} mvfx_i}{Nmvf}, \quad Mmvfy = \frac{\sum_{i=0}^{Nmvf} mvfy_i}{Nmvf} \quad \bigg\} \quad (1)$$

$$\text{WHERE,} \quad (mvfx_i, mvfy_i) \neq (0, 0)$$

$$Mmvbx = \frac{\sum_{i=0}^{Nmvb} mvbx_i}{Nmvb}, \quad Mmvby = \frac{\sum_{i=0}^{Nmvb} mvby_i}{Nmvb} \quad \bigg\} \quad (2)$$

$$\text{WHERE,} \quad (mvbx_i, mvby_i) \neq (0, 0)$$

$$Vmvfx = \frac{Nmvf \times Mmvfx^2 - 2Mmvfx \times \sum_{i=0}^{Nmvf} mvfx_i + \sum_{i=0}^{Nmvf} mvfx_i^2}{Nmvf}$$

$$Vmvfy = \frac{Nmvf \times Mmvfy^2 - 2Mmvfy \times \sum_{i=0}^{Nmvf} mvfy_i + \sum_{i=0}^{Nmvf} mvfy_i^2}{Nmvf} \quad \bigg\} \quad (3)$$

$$\text{WHERE,} \quad (mvfx_i, mvfy_i) \neq (0, 0)$$

$$Vmvbx = \frac{Nmvb \times Mmvbx^2 - 2Mmvbx \times \sum_{i=0}^{Nmvb} mvbx_i + \sum_{i=0}^{Nmvf} mvbx_i^2}{Nmvb}$$

$$Vmvby = \frac{Nmvb \times Mmvby^2 - 2Mmvby \times \sum_{i=0}^{Nmvb} mvby_i + \sum_{i=0}^{Nmvf} mvby_i^2}{Nmvb} \quad \bigg\} \quad (4)$$

$$\text{WHERE,} \quad (mvbx_i, mvby_i) \neq (0, 0)$$

SCENE CHANGE DETECTOR

BACKGROUND OF THE INVENTION

1. Field of the invention

The present invention relates to a scene change detector, and in particular to a scene change detector capable of detecting very fast and accurately a scene change for classifying scenes in video retrieval.

2. Description of the Related Art

Scene changes, which include not only an abrupt scene change, at which scene changes instantaneously, but also special effects such as dissolve and wipe.

As methods for detecting an abrupt scene change, there are methods of using a great change of a statistical characteristic, such as luminance components, motion, and so on. According to, for example, "A Fast Detecting Method of Scene Breaks from MPEG Encoded Movies", Kaneko, Hori, Information Processing Society of Japan, Annual Convention, 5N-2 (1997), the bit amount of motion vectors is used to measure a similarity between frames, and if the peak of the similarity is detected an abrupt scene change is detected. Moreover, according to "A Scene Cut Detection from Compressed Video using Interframe Luminance Difference and Chrominance Correlation", Nakajima, Institute of Electronics, Information and Communication Engineers, Spring Conference, D-501 (1994), data on discrete frames are used to combine temporal peaks of the luminance inter-frame differences and chrominance histogram correlation, so that an abrupt scene change is detected.

A decision of a flashlight scene, which may often be regarded as an abrupt scene change, is given by examining the correlation between continues plural frames. For example, Japanese Patent Application No. 9-041709 discloses that the correlation between the current frame n (n is a positive integer), which is currently used for cut detection, and the frame (n−1), and the correlation between the frame (n+1) and the frame (n−1) are examined; and then in the case that it is declared that there is an abrupt scene change between the former two frames but there is not an abrupt scene change between the latter two frames, the current frame n is judged as a flashlight scene.

Since special effects such as dissolve, fade-in/fade-out, and wipe are transitions continuing for a certain period, they can be judged by continuously observing a certain characteristic value of pixel domains, such as a change of luminance or inter-frame difference. For example, Japanese Patent Application No. 8-252333 discloses, as a method of using reduced size images, that the moving average of inter-frame activity is obtained from the frame activity, of luminance components of each frame, and further the correlation between the frames in a chrominance histogram is obtained from a histogram of chrominance signals of each frame, and in the case that their temporal changes exceed each predetermined threshold, it is judged that the scene change is dissolve. As an example of using coding parameters, apart from this, "Scene Change Detection from MPEG coded data" Niikura, Taniguti, Tomura, et al., Institute of Electronics, Information and Communication Engineers, Technical Report, IE97-65 (1997) reports that dissolve transition is detected by using the characteristic that during dissolve transition prediction errors become relatively large and their signs remain constant.

Concerning judgment of wipe, as an example of detecting wipe from reduced size images, Japanese Patent Application No. 9-041709 discloses that in the case that the number of frames whose inter-frame differential values in a certain period exceed a first threshold is larger than a second threshold and in addition the number of frames whose inter-frame differential values in periods before and after the above-mentioned period are smaller than a third threshold is larger than a fourth threshold, it is judged that the above-mentioned period is wipe. To the contrary, there has been very few report about wipe detection on coding parameters domain.

The scene change detection methods in the above-mentioned prior art have the following problems. The method of preparing reduced size images as a pre-processing of cut detection has a problem that particularly when the size of an image becomes large, processing costs in a reduced size image reconstructor cannot be ignored and the fast operation for cut detection cannot be realized. For example, in case of processing standard TV size of video, it takes almost the same time as realtime playback of compressed data.

The method of using the change of statistical characteristic between reconstructed small size images to detect a scene change has a problem that it is necessary to hold decoded frames and similarly device costs increase when the size of images becomes large.

The method using only intra-coded frames in order to reduce detection-process has a problem that because these are temporally distributed even such a scene where a camera or an object is moving may be incorrectly detected as a scene change.

The cut detection method of using a coding parameter obtained by variable-length-decoding compressed video data needs to extract the coding parameters of all blocks, and thus has a problem that in the case that the size of images becomes larger, an increase in detection time is caused. As for an image of, for example, a standard TV size, only about 1.4 times as fast operation as play backing compressed data can be realized.

Furthermore, in the case of detecting special effect such as dissolve and wipe on coding parameter domain parameter, it is difficult to detect such a special effect accurately. Thus, there remains a problem about reliability.

SUMMARY OF THE INVENTION

An object of the present invention is to provide a scene change detector capable of detecting scene changes including special effects such as dissolve or wipe at high speed and accuracy by a processing which is far less than that of conventional scene change detectors.

The present invention has the following characteristics: the present invention comprises a means for video-signal-demultiplexing compressed moving pictures data, a means for extracting at least predictive-coded mode information, motion vectors, and coded transformed coefficients from the video-signal-demultiplexed information obtained by the above-mentioned means, and a means for judging scene changes by using the extracted predictive-coded mode information, the motion vector, and the coded transformed coefficients.

The present invention makes a high speed processing possible by using, for judgment of scene changes, coding parameters obtained from video-signal-demultiplexing which is the minimum decoding process; the present invention also makes it possible to detect scene changes at a higher speed, as compared with conventional scene change detectors using coding parameters, by greatly cutting down blocks from which coding parameters should be extracted temporally and spatially.

In the present invention, it is unnecessary to apply complicated operation to the extracted coding parameters. And thus a scene change can be detected by simple thresholding process and multiplication/addition operation so that device costs can be reduced to a great extent.

The present invention also makes it possible to determine, in detecting an abrupt scene change where scenes change instantaneously, the abrupt scene change by using only predictive-coded mode information of blocks in a frame which is temporally and spatially subsampled.

In the present invention, in the case that plural frames judged as abrupt scene changes are temporally concentrated, it is judged that these frames belong to a flashlight scene so as to be excluded from the candidate of abrupt scene changes.

The present invention also makes it possible to detect special effects such as dissolve, fade-in, and fade-out, which has been entrusted to the judgment on pixel domains up to the present, by motion information and prediction error information of pictures calculated from coding parameters, thereby distinguishing them from a still scene, and a small motion scene.

The present invention also makes it possible to detect wipe, which has been so far detected by change over time in a statistical characteristic on pixel domains, by motion information and prediction error information of pictures calculated from coding parameters, thereby distinguishing them from scenes where a camera or an object is moving.

According to the present invention, an abrupt scene change and special effects including dissolve and wipe can be detected at very high speed and accuracy from coding parameters, extracted from compressed video data.

BRIEF DESCRIPTION OF THE DRAWINGS

FIGS. 3A and B are diagrams for explanation of subsampling, temporally and spatially, frames used for detecting a scene change.

FIG. 4 is a diagram for explaining coding parameters concerned with the variable-length-decoded DCT coefficient.

FIG. 6 is a block diagram showing a specific example of a special effect judging unit shown in FIG. 1.

FIGS. 8A, B and C are diagrams for explaining typical types of wipe transition.

FIG. 10 is a diagram showing expressions.

DETAILED DESCRIPTION OF THE PREFERRED EMBODIMENTS

Figure 1:
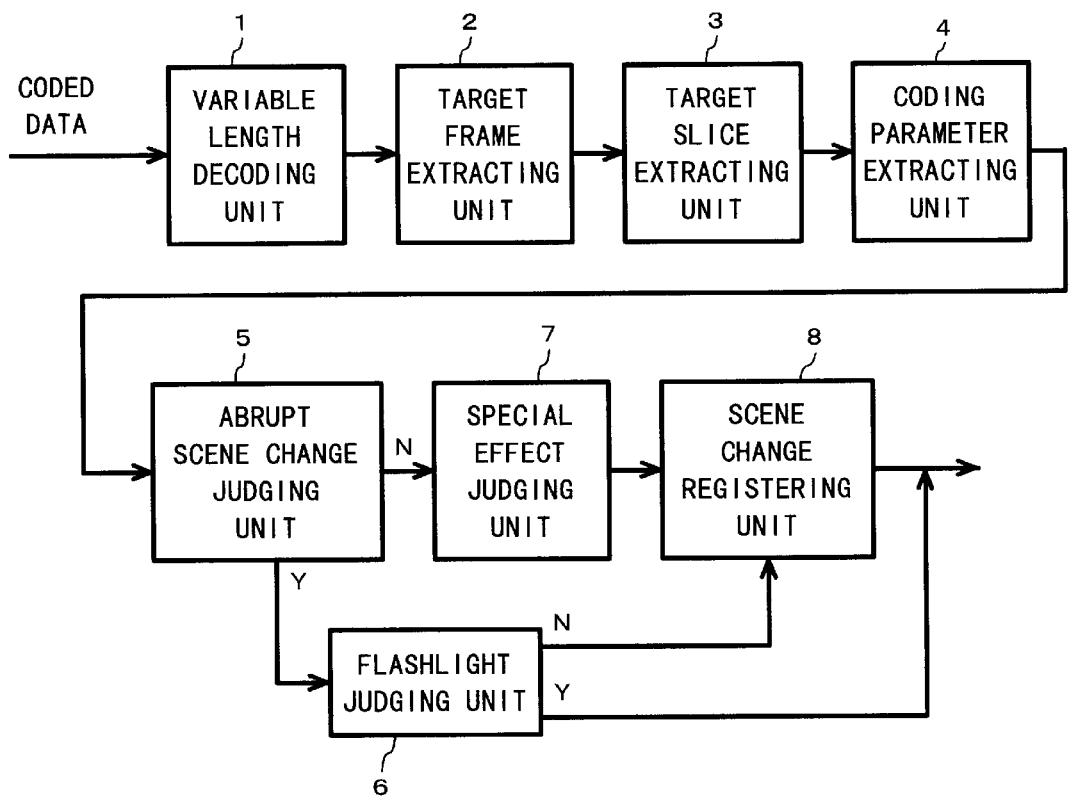
FIG. 1 is a block diagram showing a configuration of an embodiment of the present invention.

Referring to the drawings, the present invention will be described in detail hereinafter. The outline of the present invention will be described, referring to a flowchart shown in FIG. 9. First, instep S1, a frame is inputted. In step S2, coding parameters are extracted from the frame. In step S3, the extracted coding parameter is used to judge whether or not the current frame is an abrupt scene change. When this judgment is negative, the present operation goes ahead to step S4. When this judgment is affirmative, the operation goes ahead to step S9. In step S4, it is judged whether or not a dissolve transition, which is a gradual transition, is detected. When this judgment is affirmative, the operation goes ahead to step S5 to register this fact. When the judgment in step S4 is negative, the operation goes ahead to step S6 to judge whether or not a wipe transition is detected. When this judgment is affirmative, the operation goes ahead to step S7 to register this fact. Thereafter, the operation goes ahead to step S8.

On the other hand, when the judgment in step S3 is affirmative, the operation goes ahead to step S9 to judge whether or not a flashlight is detected. When this judgment is negative, the operation goes ahead to step S10 to register the fact that the current frame is an abrupt scene change. When the judgment in step 9 is affirmative, the operation goes ahead to step S8. In step S8, it is judged whether or not the inputted frame is the last frame. When this judgment is negative, the operation goes back to step S1 and then next frame is inputted. This invention is characterized in that the coding parameters extracted in step S2 are used to perform the scene change detection process in steps S3, S4, S6 and S9.

The following will describe one embodiment of the present invention in detail, referring to a block diagram shown in FIG. 1. This embodiment, which will be described in the following, relates to a scene change detection method from moving picture data compressed by MPEG, which is the international standard of generic coding of moving pictures. However, the present invention is not limited to this embodiment, and can be applied to data compressed by other compression methods so that scene changes can be detected in a similar way.

In this embodiment, the following conditions are assumed. About MPEG data, 15 or 12 frames makes a single group of pictures and the interval of I picture-P picture or P picture-P picture is 3 frames. Moreover, for B pictures at the beginning of a certain group of pictures, prediction from a just previous group of pictures is allowed. These conditions are included in the common MPEG format.

First, MPEG compressed data are inputted in a variable length decoding unit 1, so that a target frame extracting unit 2 skips some compressed data, on the basis of a picture start code and temporal reference values, so as to take out only frames which are used for detection. Further, for the taken-out target frames, a target slice extracting unit 3 skips some compressed data on the basis of a slice start code so as to take out only areas to which the blocks used for detection belong. As illustrated in, for example, FIGS. 3A and B, the object frame extracting unit 2 can extract the latter B pictures (B1, B4, B7, B10 . . . ) between two reference frames, and the target slice extracting unit 3 can extract areas S1–S5 obtained by subsampling slices belonging to the B pictures vertically.

In order to extract coding parameters necessary for scene change detection from blocks belonging to the areas S1–S5, the blocks are inputted to a coding parameter extracting unit 4.

Figure 2:
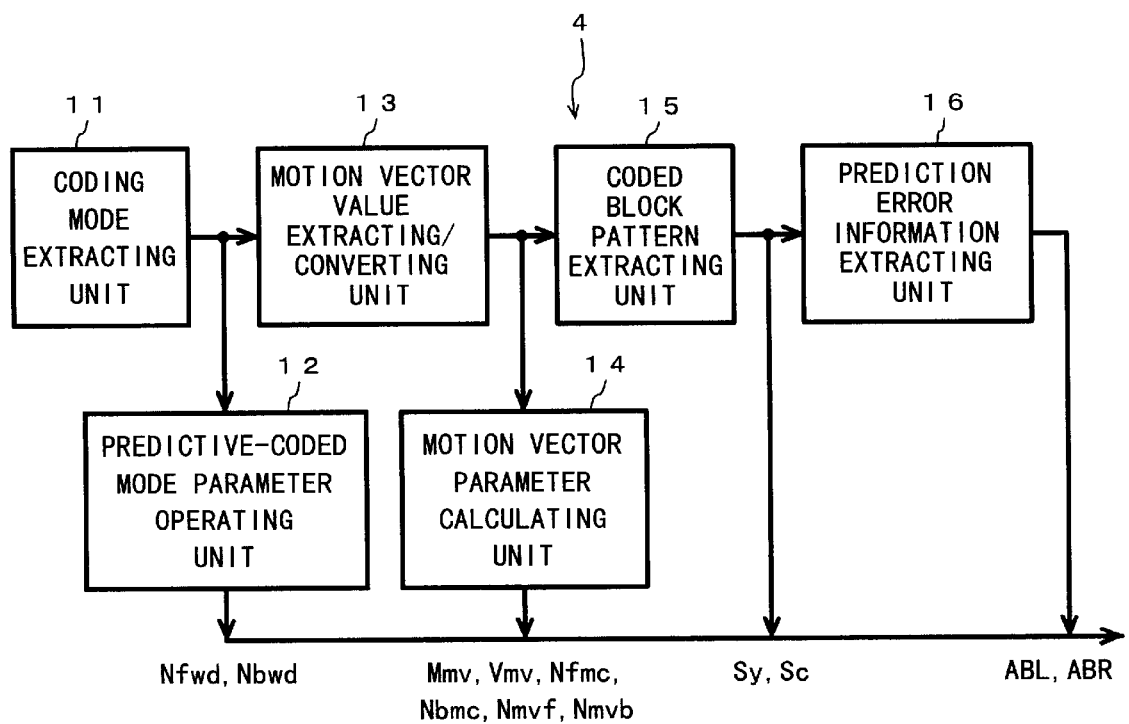
FIG. 2 is a block diagram showing a specific example of a coding parameter extracting unit.

The following will describe the constitution and the operation of the coding parameter extracting unit 4. FIG. 2 is a block diagram illustrating a specific example of the coding parameter extracting unit 4. This coding parameter extracting unit 4 is composed of a predictive-coded mode extracting unit 11, a predictive-coded mode parameter operating unit 12, motion vector value extracting/converting unit 13, a motion vector parameter calculating unit 14, a coded block pattern extracting unit 15 and a prediction error information extracting unit 16.

The predictive-coded mode extracting unit 11 classifies inputted blocks according to their predictive-coded mode. The predictive-coded mode parameter operating unit 12 counts Nfwd, the number of blocks having a forward predictive-coded mode, and Nbwd, the number of blocks having a backward predictive-coded mode.

Next, the motion vector value extracting/converting unit 13 variable-length-decodes coded motion vector values of the blocks. Since the vector value obtained by the variable-length-decoding is a differential value from the previous vector value on the left, the motion vector value extracting/converting unit 13 further converts the differential value into a normalized vector value. This differential value is initialized at the left end block of the frames, that is at the beginning of the slice in this embodiment. Therefore, a correct vector value can be reproduced even if a subsampling process is performed in a slice unit as in the present invention.

In the motion vector parameter calculating unit 14, reconstructed vector values are accumulated for the above-mentioned areas, and then the average and the variance of the motion vectors of the whole areas are outputted. As shown by the expressions (1)–(4) in FIG. 10, concerning these, Mmvfx, Mmvfy, Mmvbx, Mmvby, Vmvfx, Vmvfy, Vmvbx and Vmvby are defined as their x component (the horizontal direction) and their y component (the vertical direction) in the forward direction and in the backward direction.

In FIG. 10, Mmv and Vmv represent the average of the motion vectors and the variance of the motion vectors, respectively, and f, b, x and y represent the forward direction, the backward direction, the horizontal direction and the vertical direction, respectively.

For example, Mmvfx and Vmvby represent the average of the horizontal components of forward motion vectors and the variance of the vertical components of backward motion vectors, respectively. Nfmc and Nbmc represent the number of blocks having a forward motion vector whose absolute value is larger than a given threshold (for example, 4) and the number of blocks having a backward motion vector whose absolute value is larger than a given threshold (for example, 2), respectively. Furthermore, Nmvf and Nmvb represent the number of blocks having a forward motion vector and a backward vector [whose component is not (0, 0)], respectively.

Next, concerning the blocks belonging to the slice areas S1–S5, coding parameters representing whether sub-blocks belonging to the blocks are coded or not coded are inputted to the coded block pattern extracting unit 15. The values extracted in the coded block pattern extracting unit 15 are accumulated for the areas, so as to count the number Sy of coded luminance sub-blocks and the number Sc of coded chrominance sub-blocks in the whole of the areas.

Thereafter, concerning the sub-blocks belonging to the blocks, coding parameters concerned with the DCT coefficient are inputted to the prediction error information extracting unit 16. In this unit, the variable-length-decoded coding parameters concerned with the DCT coefficient are used to obtain, for the ith coded sub-blocks 31 belonging to the areas, the following two sum totals: the sum total, in all of the sub-block, of accumulative absolute values BLi (per block) of non-zero coefficients (levels), excluding DC components; and the sum total, in all of the sub-block, of frequency bands BRi wherein a non-zero coefficient exists (the number of 0 runs up to the last non-zero coefficient of the sub-block+the number of non-zero coefficients), as shown in FIG. 4. By dividing these sum totals by the number Nsbc of coded sub-blocks as shown in the following expressions (5) and (6), the average level ABL and the average run length ABR of the sub-blocks belonging to the above-mentioned areas are obtained.

$$ABL = \frac{\sum_{i=0}^{Nsbc-1} BL_i}{Nsbc} \qquad (5)$$

$$ABR = \frac{\sum_{i=0}^{Nsbc-1} BL_i}{Nsbc} \qquad (6)$$

As the number Nsbc of coded sub-blocks, any of the number Sy of coded luminance sub-blocks, the number Sc of coded chromination sub-blocks, or Sy+Sc may be used.

After the above-mentioned coding parameters are extracted, the above-mentioned frame together with these coding parameters are inputted to the respective scene change judging unit 5 and 6 in FIG. 1. They are first inputted to the abrupt scene change judging unit 5, and then are inputted to the flashlight judging unit 6 as post-processing.

Figure 5A:
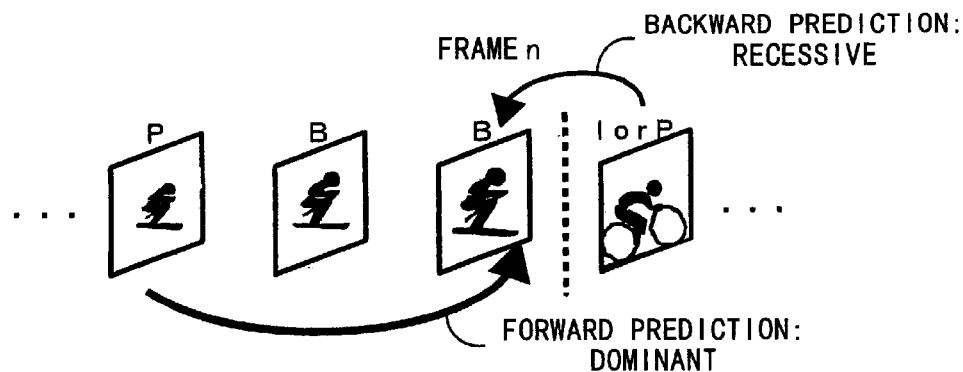
FIGS. 5A, B and C are diagrams for explaining an abrupt scene change.

In this case, as shown in FIG. 5A, if an abrupt scene change arises at a reference frame (an intra-coded picture or a predictive-coded picture) just after the current frame n, forward prediction is dominantly used, but backward prediction is hardly used. Therefore, in the case that concerning Nfwd and Nbwd obtained in the predictive-coded mode parameter operating unit 12, the Nfwd is larger than a given threshold Tha1 (for example, 35% of the total number of the blocks in the frame n) and the Nbwd is smaller than a given threshold Tha2 (for example, 10% of the total number of the blocks in the frame n) as shown in the expression (7), it is judged that the reference frame just after the current frame n is an abrupt scene change candidate.

$$Nfwd > Tha1, \text{ and } Nbwd < Tha2 \qquad (7)$$

If the flashlight judging unit 6 does not detect an abrupt scene change at the previous frame (n−1), the current frame n is detected as an abrupt scene change.

Figure 5B:
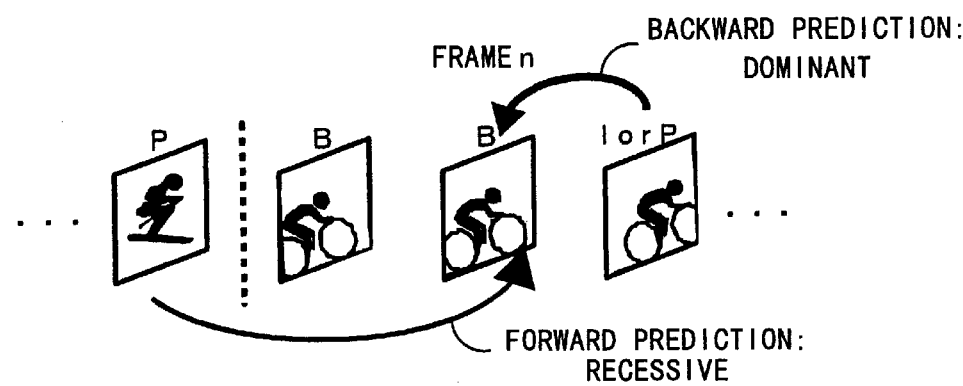
Figure 5C:
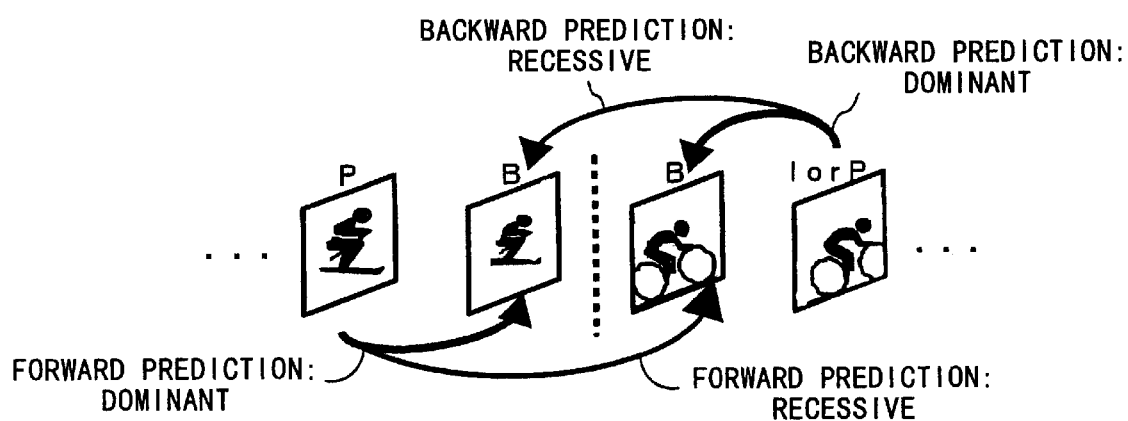

Similarly, as shown in FIG. 5B, in the case that an abrupt scene change occurs at the frame n or the just previous B picture, backward prediction is dominantly used, but forward prediction is hardly used. Therefore, in the case that the Nbwd is larger than a given threshold Tha3 (for example, 30% of the total number of the blocks in the frame n) and the Nfwd is smaller than a given threshold Tha4 (for example, 5% of the total number of the blocks in the frame n) as shown in the expression (8), it is judged that an abrupt scene change occurs at the frame n or the just previous B picture.

$$Nbwd > Tha3, \text{ and } Nfwd < Tha4 \qquad (8)$$

If the flashlight judging unit 6 does not detect an abrupt scene change at the just previous frame (n−1), the current frame n or the just previous B picture is detected as an abrupt scene change. At this time, in order to clarify at which B pictures an abrupt scene change arises, both B pictures between two reference pictures are used to detect an abrupt scene change.

Concerning the first B picture B1 and the second B picture B2, for example, in the case that in the picture B1 forward prediction is dominantly used but backward prediction is hardly used and conversely in the picture B2 forward prediction is hardly used but backward prediction is dominantly used, the picture B2 is judged as an abrupt scene change. On the other hand, in the case that in both of the pictures B1 and B2 backward prediction is dominantly used but forward prediction is hardly used, the picture B1 is judged as an abrupt scene change.

In the case that the frames n and (n−1) are continuously judged as abrupt scene changes, these frames are regarded as being in a flashlight scene and then are excluded from candidates of abrupt scene changes. Therefore, the present operation does not go ahead to the processing in the special effect judging unit 7.

Concerning the frame judged as an abrupt scene change through the abrupt scene change judging unit 5 and the flashlight judging unit 6, its time code is registered in a scene change registering unit 8.

The frame which is not detected as an abrupt scene change by the abrupt scene change judging unit 5 is forwarded to the special effect judging unit 7. As shown in FIG. 6, the special effect judging unit 7 has a parameter evaluating unit 20, a dissolve judging unit 21, a first wipe judging unit 22 and a second wipe judging unit 23 (as a sub-processing unit)

Figure 7:
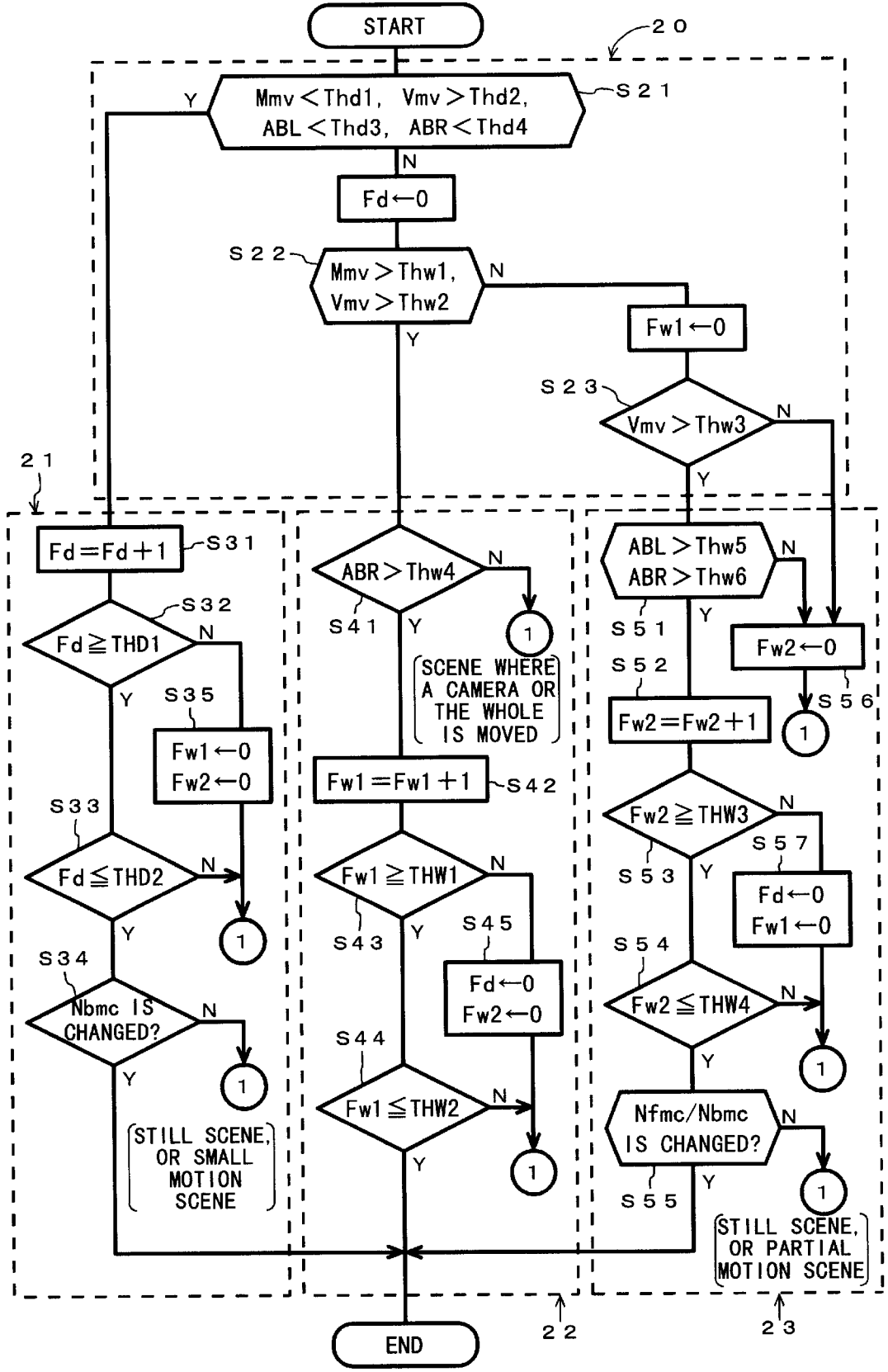
FIG. 7 is a flowchart showing the operation of the special effect judging unit shown in FIG. 1.

The following will describe these operations referring to FIGS. 7 and 8. FIG. 7 is a flowchart illustrating the operation, and FIG. 8 is a diagram showing typical types of wipe.

First, the following are inputted, as common factors needed for judging dissolve and wipe, to the parameter evaluating unit 20 of the special effect judging unit 7: the average (of the motion vectors) Mmv and the variance (of the motion vectors) Vmv obtained by the motion vector parameter calculating unit 14; and the parameters ABL and ABR concerned with prediction error information, that is, the average level ABL and the average run length ABR of sub-blocks. Moreover, the number Nbmc of blocks having a backward motion vector is inputted as a parameter needed for judging dissolve, and the Nfmc concerned with a forward vector, as well as the Nbmc, is inputted as a parameter needed for judging wipe.

The parameter evaluating unit 20 evaluates each of the inputted parameters by thresholding processes, and then forwards the frames meeting the condition of the respective sub-processings (dissolve judgment processing, first wipe judgment processing, and second wipe judgment processing) to the respective judging units 21–23 for the respective sub-processings. In this evaluation, if the parameters of the frames are not meeting the conditions of any sub-processings, the present operation goes ahead to a next frame input processing.

Since motion hardly occurs during dissolve transition, it is expected that small and random motion vectors are appeared. Furthermore, it is expected that in dissolve, wherein a scene gradually changes to another, motion compensation is effectively performed. Therefore, as shown in step S21 in FIG. 7, the parameter evaluating unit 20 forwards the frames to the dissolve judging unit 21 in the case that the averages Mmvfx and Mmvbx, in the x direction, of the motion vectors in the frames are smaller than a given threshold Thd1 (for example, the absolute value 2), the variance Vmvfx is larger than a given threshold Thd2 (for example, 50), and ABL and ABR are smaller than a given threshold Thd3 (for example, 2.5) for ABL and a given threshold Thd4 (for example, 15) for ABR, respectively.

However, this characteristic is also found in a still scene or such a scene that slight motion arises in the whole of frame. Thus, the dissolve judging unit 21 distinguishes between still/slight motion scenes and dissolve.

It is considered that the distribution of motion does not change in a still scene or a slight motion scene. Thus, if the number of dissolve candidate frames, Fd, inputted to the dissolve judging unit 21 is observed, the number of blocks having a backward motion vector, Nbmc, continues to take large values. On the other hand, in dissolve, wherein the distribution of motion changes because a new scene is synthesized, some change of Nbmc arises (for example, suddenly decreases).

When continuous frames are entered into the dissolve judging unit 21 to examine the characteristic of the frames, the counter for the number of dissolve candidate frames Fd increases by one as shown in step S31 in FIG. 7. If this counter exceeds a given threshold THD1 (for example, 5), (that is, when the judgment in step S32 is affirmative), the operation goes ahead to step S33 to evaluate the temporal change of Nbmc. If the Fd does not exceed the THD1 (that is, the judgment in step S32 is negative), the operation goes ahead to step S35 for a new frame input processing. Thereafter, the counters Fw1 and Fw2 for the number of wipe candidate frames are zeroed. All of the symbols ①in FIG. 7 go ahead to the symbols ①in FIG. 9. When the frames are not inputted in the dissolve judging unit 21, Fd is zeroed.

Concerning the continuous Fd (over THD1) frames, if each Nbmc of them continues to take a large value (that is, the judgment in step S34 is negative), the frames are judged as a still scene or a scene that has slight motion in the whole of each frame. If not so (that is, the judgment in step S34 is affirmative), these frames are decided to belong dissolve transition. However, if Fd exceeds THD1 greatly, the frames are decided not to belong to a dissolve transition (the affirmation in step S33).

The frames judged as dissolve in the dissolve judging unit 21 is forwarded to the scene change registering unit 8 (see FIG. 1) to be registered the time code after the end of the dissolve. If the frames are not judged as dissolve, the operation goes back to a new frame input processing (step S1 in FIG. 9).

On the other hand, in the case that any of the 4 averages Mmv of the motion vectors is larger than a given threshold Thw1 (for example, the absolute value 10) and any of the 4 variances Vmv is larger than a given threshold Thw2 (for example, 100) (that is, the judgment in step S22 is affirmative) according to the evaluation in the parameter evaluating unit 20, the frames are forwarded to the first wipe judging unit 22. In the case that the above-mentioned two conditions are not satisfied at the same time but any of the 4 variances Vmv is larger than a given threshold Thw3 (for example, 50) (that is, the judgment in step S23 is affirmative), the frame are forwarded to the second wipe judging unit 23.

Concerning the wipe models shown in FIG. 8, the wipe detected in the first wipe judging unit 22 is the one shown in FIGS. 8A or B. The wipe detected in the second wipe judging unit 23 is the one shown in FIG. 8C.

In the case that camera operation such as panning, or object motion in the whole of frame, is present in a scene, both of the average and the variance of motion vectors are large. Therefore, the following processing is performed in the first wipe judging unit 22 to distinguish between wipe and these scenes where large vectors appear as shown in FIGS. 8A and B.

In scenes where a camera or an object moves, motion compensation is effectively performed over the whole of each frame. Thus, it can be regarded that the frame average of prediction errors is generally small. On the other hand, since a new scene makes appearance in wipe transition, the area wherein motion compensation is effectively used is limited so that the frame average of prediction errors becomes large. Thus, if ABR of the current frame is larger than a given threshold Thw4 (for example, 10) (that is, the judgment in step S41 is affirmative), the frame can be judged as a wipe candidate. If not so, the frame can be decided to belong to a scene where a camera or an object is moving. In the case that the number of frames judged as the wipe candidate Fw1 reaches a given threshold THW1 (for example, 10 or 11) (that is, the judgment in step S43 is affirmative), the frames are judged as being present in a wipe transition. Further, in the case that Fw1 exceeds THW1 greatly, the frames are decided not to belong to a wipe transition (step S44).

On the other hand, the variance of motion vectors becomes large in a still scene or such a scene that partial motion arises in frames. Accordingly, the second wipe judging unit 23 performs the following processing to distinguish between these scenes and wipe wherein large vectors do not make appearance, as shown in FIG. 8C.

First, in the same way as described above, using the fact that the frame average of prediction error information becomes large in any wipe, ABL and ABR are thresholding-processed wherein a given threshold Thw5 (for example, 2.5) for ABL and a given threshold Thw6 (for example, 12) for ABR are used, respectively (step S51), so as to select frames of a wipe candidate.

The motion distributions of two synthesized scenes are different in a wipe transition. Thus, if concerning certain continuous frames the number of blocks having significant vectors is observed, the number tends to decrease or increase. On the contrary, in a still scene or a scene wherein partial motion arises in frames, the number of blocks having significant vectors take a large or small value in each of continuous frames and hardly changes. Therefore, in the case that the continuous Fw2 frames judged as a wipe candidate in the second wipe judging unit 23 exceeds a given threshold THW3 (for example, 5) (that is, the judgment in step S53 is affirmative) and their Nfmc and Mbmc continue to take large or small values, the frames can be decided to belong to a still scene. In the case that both of Nfmc and Nbmc tend to increase or decrease (that is, the judgment in step S 55 is affirmative), the frames can be decided to belong to a wipe transition. On the other hand, in the case that the judgment in step S55 is negative, the frames are judged as a still scene or a scene wherein partial motion arises in frames. Similar to the first wipe judging unit 22, if Fw2 exceeds THW3 greatly, the frames are not judged as being in a wipe transition(step S54).

Figure 9:
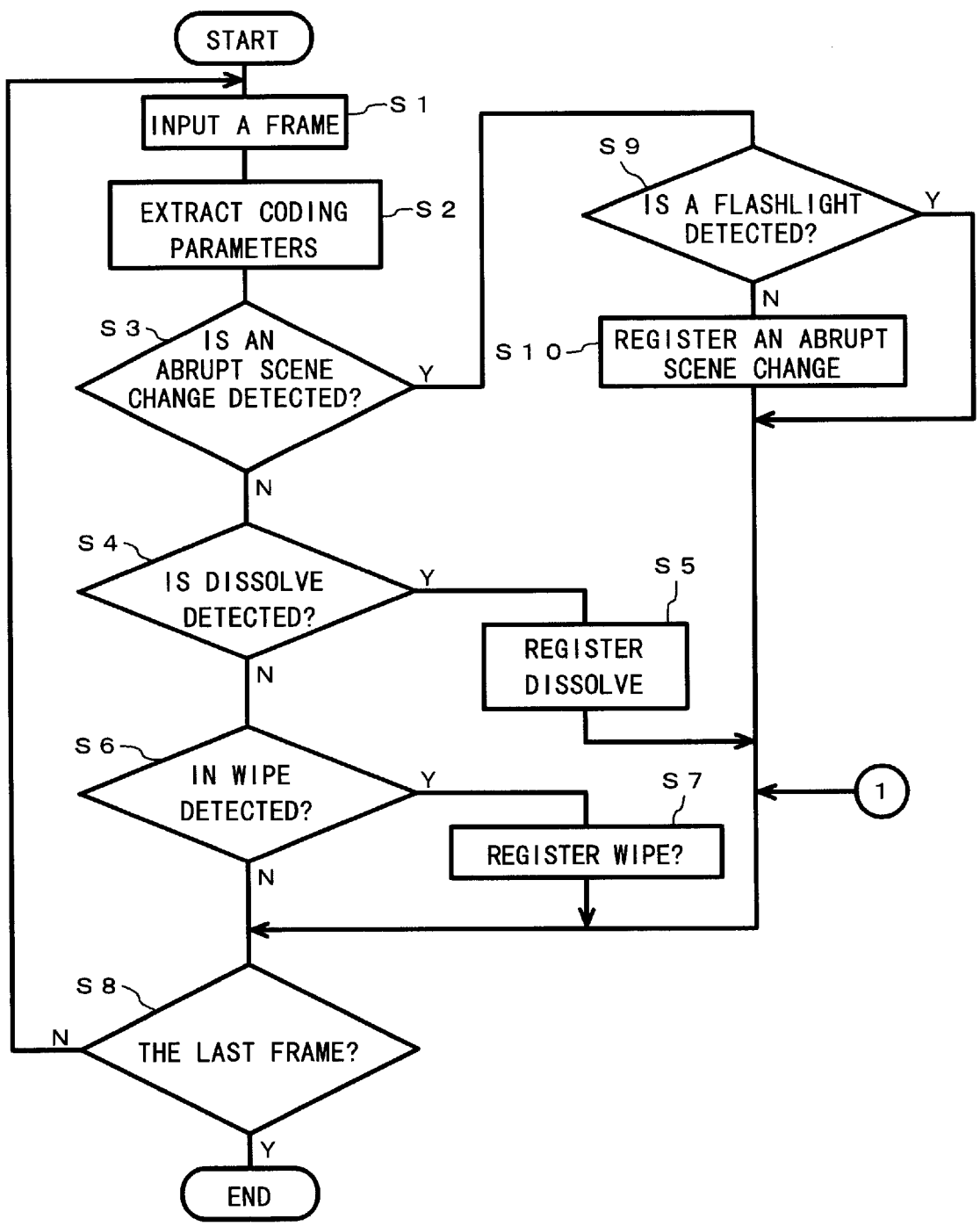
FIG. 9 is a flowchart illustrating the outline of the operation of the present invention.

The frames judged as a wipe in the first or second wipe judging unit 22 or 23 are forwarded to the scene change registering unit 8 to be registered the time code after the end of the wipe (step S7 in FIG. 9).

As described above, according to the present invention, an abrupt scene change, and special effects such as dissolve and wipe can be detected by using only coding parameters extracted from compressed video data by only video-signal-demultiplexing, which is the minimum decoding process. For this reason, the present invention has an advantage that processing time for detecting a scene change can be reduced to a great extent. Moreover, statistical properties, on coding parameter domain, of various scene changes are used, and thus highly accurate detection can be carried out.

For example, in the case of using video data of a standard TV size, where conventional methods need about the same time as realtime playback for scene change detection, the present invention can realize 6 times as fast processing as the method of using contacted images to detect a scene change. The accuracy according to the present invention also is equal to or higher than that of the comparative method.

Additionally, the present invention does not need complicated operation to be applied to extracted coding parameters. Thus, a scene change can be detected by simple thresholding processes and multiplication/addition operation. As a result, device costs can be greatly reduced.

What is claimed is:

1. A scene change detector for detecting scene changes from compressed video data, comprising:

a means for video-signal-demultiplexing the compressed video data to obtain video-signal demultiplexed information;

a means for extracting at least predictive-coded mode information, motion vectors, and coded transformed coefficients from the video-signal-demultiplexed information obtained by the means for video-signal-demultiplexing; and a means for judging an abrupt scene change by counting a number of blocks each having a forward prediction mode and a backward prediction mode by using at least the predictive-coded-mode information and comparing the number of blocks with a predetermined threshold; and a means for judging candidates of dissolve and wipe in remaining video data, which is not judged as the abrupt scene change, by comparing at least motion characteristics calculated from values of the motion vectors and predictive-coded picture characteristics calculated from the coded transformed coefficients with another predetermined threshold.

2. A scene change detector according to claim 1, further comprising a means for temporally subsampling frames which are used for detection.

3. A scene change detector according to claim 1, further comprising a means for spatially subsampling, in respective frames, areas from which the coding parameters are extracted.

4. A scene change detector according to claim 2, further comprising a means for spatially subsampling, in respective frames, areas from which the coding parameters are extracted.

5. A scene change detector according to claim 1, wherein based on a characteristic that scenes change greatly before and after an abrupt scene change, classifying blocks according to the predictive-coded mode information of compressed video data makes it possible to detect an abrupt scene change.

6. A scene change detector according to claim 2, wherein based on a characteristic that scenes change greatly be fore and after an abrupt scene change, classifying blocks according to the predictive-coded mode information of compressed video data makes it possible to detect an abrupt scene change.

7. A scene change detector according to claim 3, wherein based on a characteristic that scenes change greatly before and after an abrupt scene change, classifying blocks according to the predictive-coded mode information of compressed video data makes it possible to detect an abrupt scene change.

8. A scene change detector according to claim 1, wherein in the case that, concerning an inputted bidirectionally predictive-coded picture, the number of blocks each having a forward prediction mode is larger than a threshold and the number of blocks each having a backward prediction mode is smaller than another threshold, an abrupt scene change is declared to occur after the inputted frame.

9. A scene change detector according to claim 1, wherein in the case that, concerning an inputted bidirectionally predictive-coded picture, the number of blocks each having a forward prediction mode is smaller than a threshold and the number of blocks each having a backward prediction mode is larger than another threshold, an abrupt scene change is declared to occur at each bidirectionally predictive-coded frame between two reference frames.

10. A scene change detector according to claim 1, wherein in the case that an interval of two frames which are detected as abrupt scene changes is shorter than a threshold, these abrupt scene changes are decided to belong to a flashlight scene and then excluded from candidates of abrupt scene changes.

11. A scene change detector according to claim 1, further comprising a means for detecting dissolve, concerning inputted frames, by using motion characteristics calculated from motion vector values, predictive-coded picture characteristics calculated from frequency-domain coefficients of blocks, and a number of blocks each having a motion vector that is larger than a threshold.

12. A scene change detector according to claim 11, wherein in the case that an average of motion vectors of an inputted frame of the inputted frames is smaller than a threshold, a variance of the motion vectors of the inputted frame is larger than another threshold, and a prediction error defined by the block average of non-zero coefficients in the blocks and a frequency band where non-zero coefficients are present is smaller than another threshold, and wherein if the number of blocks having a motion vector larger than another threshold and each block of the number of blocks is larger than another threshold, the inputted frame is regarded as a part of a still scene or a small motion scene, and if each block of the number of blocks is smaller than another threshold, the inputted frame is decided to be a dissolve candidate.

13. A scene change detector according to claim 11, wherein in the case that frames detected as dissolve candidates appear continuously for a number of times that is greater than a threshold, it is decided that a dissolve transition occurs during a period when frames detected as dissolve candidates appear continuously for the number of times that is greater than the threshold.

14. A scene change detector according to claim 1, further comprising a means for detecting wipe, concerning an inputted frame, by motion characteristics calculated from the motion vector values, and predictive-coded picture characteristics calculated from frequency-domain coefficients of blocks.

15. A scene change detector according to claim 14, wherein in the case that both of an average and a variance of motion vectors of the inputted frame are larger than respective thresholds, if a block average of frequency bands where non-zero coefficients are present in the blocks is smaller than another threshold, the inputted frame is regarded as a part of a scene including a camera operation, and if the block average of frequency bands where non-zero coefficients are present in the blocks is larger than another threshold, the inputted frame is decided as a wipe candidate.

16. A scene change detector according to claim 14, wherein in the case that at least one of an average and a variance of motion vectors of the inputted frame is smaller than a threshold, and the variance is larger than another threshold, if a predicted error defined by a block average of non-zero coefficients in the blocks and frequency bands where non-zero coefficients are present is larger than another threshold, the inputted frame is decided as a wipe candidate.

17. A scene change detector according to claim 15, wherein in the case that frames detected as wipe candidates appear continuously for a number of times that is greater than a threshold, it is decided that a wipe transition occurs during a period when frames detected as wipe candidates appear continuously for the number of times that is greater than the threshold.

18. A scene change detector according to claim 16, wherein in the case that frames detected as wipe candidates appear continuously for a number of times that is greater than a threshold, it is decided that a wipe transition occurs during a period when frames detected as wipe candidates appear continuously for the number of times that is greater than the threshold.

19. A scene change detector according to claim 15, wherein in the case that a number of blocks of frames where wipe candidates are detected, with each of the number of blocks having a motion vector larger than a threshold, if the number of blocks increases or decreases in a continuous frame period, it is decided that a wipe transition is present in the continuous frame period, and if the number of blocks neither increases nor decreases in the continuous frame period, it is decided that a still scene is present in the continuous frame period.

20. A scene change detector according to claim 16, wherein in the case that a number of blocks of frames where wipe candidates are detected, with each of the number of blocks having a motion vector larger than a threshold, if the number of blocks increases or decreases in a continuous frame period, it is decided that a wipe transition is present in the continuous frame period, and if the number of blocks neither increases nor decreases in the continuous frame period, it is decided that a still scene is present in the continuous frame period.

* * * * *